No. 622,739. Patented Apr. 11, 1899.
H. A. WAHLERT.
PIPE CLAMP.
(Application filed Aug. 8, 1896.)
(No Model.)
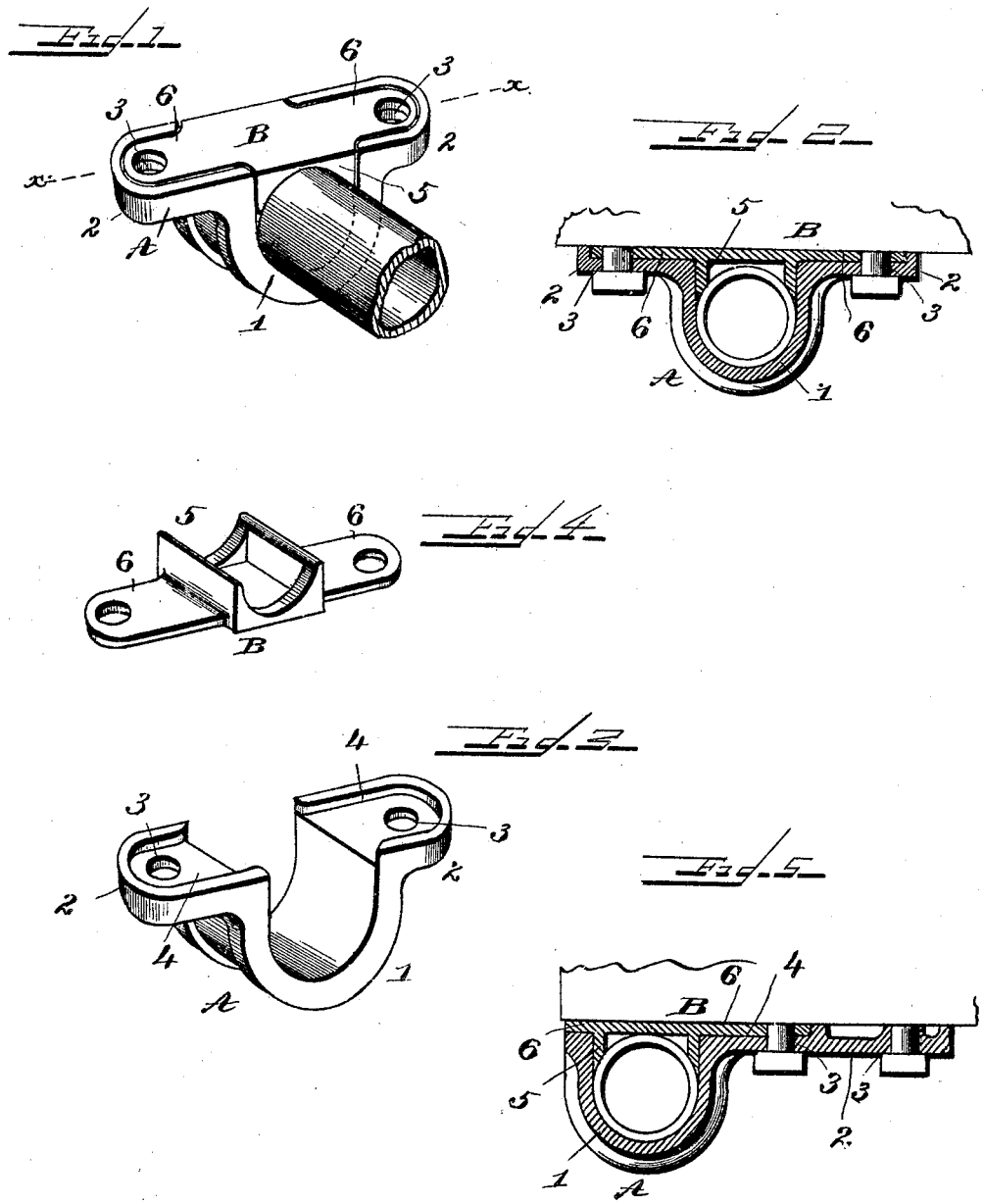

UNITED STATES PATENT OFFICE.

HENRY A. WAHLERT, OF ST. LOUIS, MISSOURI, ASSIGNOR TO THE ACME PIPE CLAMP COMPANY, OF ILLINOIS.

PIPE-CLAMP.

SPECIFICATION forming part of Letters Patent No. 622,739, dated April 11, 1899.

Application filed August 8, 1896. Serial No. 602,144. (No model.)

*To all whom it may concern:*

Be it known that I, HENRY A. WAHLERT, a citizen of the United States, residing at St. Louis, in the State of Missouri, have invented certain new and useful Improvements in Pipe-Clamps; and I hereby declare the following to be a full, clear, and exact description of the same, reference being had to the accompanying drawings, in which—

Figure 1 is a perspective view of a pipe-clamp embodying my invention. Fig. 2 is a transverse section thereof on the line $x\ x$, Fig. 1. Fig. 3 is a detached bottom perspective of the yoke or cap section of the clamp. Fig. 4 is a detached perspective view of the bed or seat section of the clamp, and Fig. 5 is a sectional view of a modification adapted for use where all the fastenings of the clamp are by choice or necessity located on one side of the yoke.

The object of this invention is to secure a simple and effective pipe-clamp adapted for use where the piping is to be attached in close proximity to a plain surface, such as a wall, the bottom of a car, and in like positions; and, generally stated, the invention consists in the combination, in a pipe-clamp, of a bed or seat section having lateral perforate ears and a yoke or cap section recessed on its under surface for the reception of the perforate ears of the bed-section, whereby the sections are interlocked, their alinement preserved, and the parts of the clamp secured to each other and their support by a single set of bolts or equivalent devices. While of general utility wherever pipes are to be secured to plain surfaces and with little projection, my pipe-clamp has been more especially devised for attaching to cars the air-pipes of a brake system.

I will now proceed to describe my invention more fully, so that others skilled in the art to which it appertains may apply the same.

In the drawings, A indicates the yoke or cap section, and B the bed or seat section.

The yoke or cap section is of general U shape, having the arch 1, and at one or both sides thereof a laterally-projecting strap 2, perforated, as at 3, for the passage of the bolts or equivalent fastenings whereby the clamp is secured. The length of the lateral strap will depend on whether all the bolt-holes 3 or fastenings are on one side of the arch 1, as in Fig. 5, or divided and applied on both sides of the arch 1, as shown in Figs. 1, 2, and 3; but in either case the under side of the strap will be recessed, as at 4, for the reception of lateral ears on the bed-section B.

The bed-section B is formed with a raised seat-section 5, corresponding with the inside measurement or width of arch 1, up into which it projects, being concave on its face to form a seat for the pipe, which will be gripped between said seat and the top of the arch 1. Projecting laterally from said raised seat-section 5 is one or more laterally-projecting perforated ears 6, adapted to fit within the recess or recesses 4 on the under side of the straps 2 of the cap-section A, and the perforations of said ears 6 are so located as to register with the perforations or bolt-holes 3 of the straps, so that a single set of fastenings will serve to secure both the bed and cap sections, as well as to preserve their alinement and to force said sections together and cause them to clamp and hold the inserted pipe or tube.

Having thus described my invention, what I claim, and desire to secure by Letters Patent, is—

A pipe-clamp comprising a raised concave bed having one or more lateral perforate lugs or ears at its base, and an arched cap having one or more laterally-projecting perforate base-straps recessed upon the under surface said cap adapted to include or inclose and sustain the bed-section, substantially as and for the purposes specified.

In testimony whereof I affix my signature, in presence of two witnesses, this 25th day of July, 1896.

HENRY A. WAHLERT.

Witnesses:
JNO. R. WILLIAMS,
ARTHUR DIGBY.